May 10, 1927.  G. E. A. HALLETT  1,627,775

DRIVING CONNECTION BETWEEN A ROTATING SHAFT AND RECIPROCATING PISTON

Filed June 23, 1925  2 Sheets-Sheet 1

Inventor
Geo. E. A. Hallett
By Spencer Sewall & Hardman
his Attorneys

May 10, 1927.

G. E. A. HALLETT 1,627,775

DRIVING CONNECTION BETWEEN A ROTATING SHAFT AND RECIPROCATING PISTON

Filed June 23, 1925　　2 Sheets-Sheet 2

Inventor
Geo. E. A. Hallett

By Spencer Sewall & Hardman
his Attorneys

Patented May 10, 1927.

1,627,775

UNITED STATES PATENT OFFICE.

GEORGE E. A. HALLETT, OF DAYTON, OHIO, ASSIGNOR TO GENERAL MOTORS RESEARCH CORPORATION, OF DAYTON, OHIO, A CORPORATION OF DELAWARE.

DRIVING CONNECTION BETWEEN A ROTATING SHAFT AND RECIPROCATING PISTON.

Application filed June 23, 1925. Serial No. 39,075.

This invention relates to the driving connection between a reciprocating piston and a rotary crank shaft and is applicable to either small engines or reciprocating pumps.

An object of the invention is to eliminate the usual connecting rod on small size pumps and engines and substitute therefor a simpler and cheaper mechanism, which also has the advantages of less vibration.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
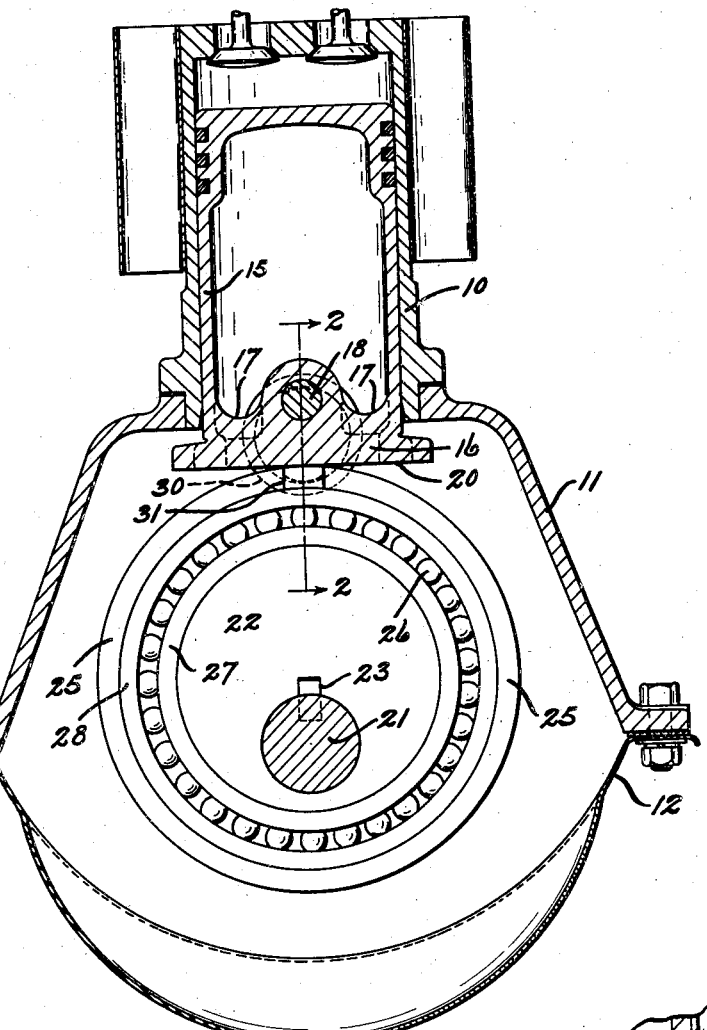
Fig. 1 is a vertical section through an air cooled internal combustion engine embodying one form of this invention.
Figures 2, 3:
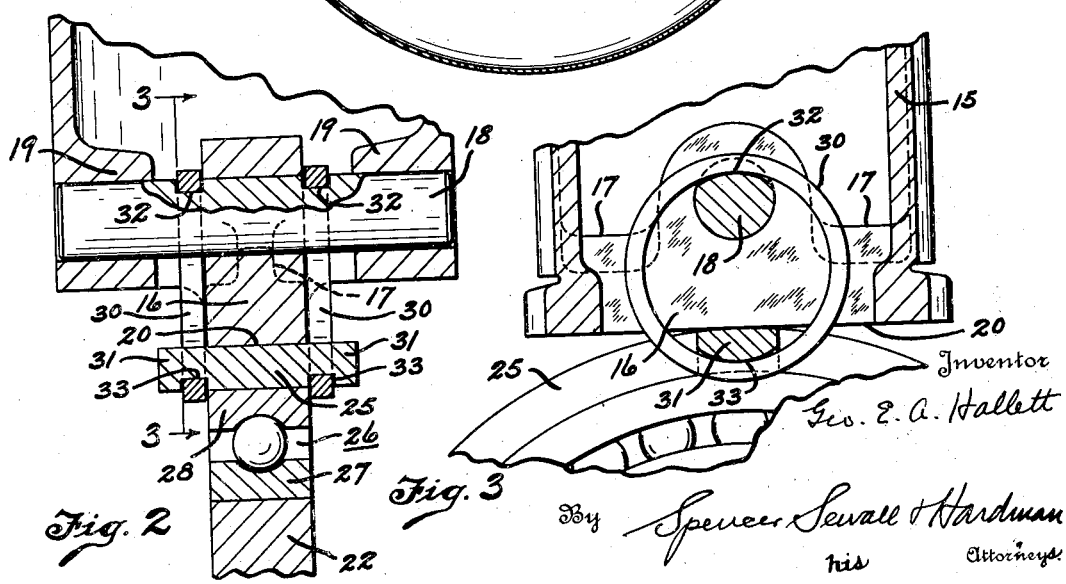
Fig. 2 is an enlarged section taken on line 2—2 of Fig. 1.
Fig. 3 is a section taken on line 3—3 of Fig. 2.

Numeral 10 designates the engine cylinder, 11 the upper half of the crank case, and 12 the lower half of the crank case. These parts form no part of the present invention and may be of any usual or desired construction such as is well known in the art.

This invention comprises only the piston and crank shaft construction and their interconnection.

The piston 15 has a long skirt which has a transverse bridge 16 across the bottom thereof. This bridge 16 is preferably cast integral with the piston and is strongly braced thereto by strengthening ribs 17 and by the transverse pin 18 which is supported in suitable bosses 19 on opposite sides of the skirt walls. The bottom face of bridge 16 forms the cam face 20 of the piston 15.

The straight shaft 21 has an eccentric disk 22 keyed thereto by key 23, thus forming a crank throw on shaft 21. A ring 25 constituting means for bearing upon the piston cam face is rotatably mounted upon the eccentric disk 22 by the ball bearing 26, the inner race 27 of which is fixed to the disk 22 and the outer race 28 of which is fixed to the ring 25. The cam face 20 of piston 15 rides upon the periphery of ring 25 and is held in contact therewith by the two spring rings 30 which loop around the pin 18 in piston 15 and around the lugs 31 which are preferably integral with ring 25, thus urging face 20 into tight engagement with ring 25. The pin 18 is provided with two slots 32 which serve as seats for the spring rings 30. Likewise the lugs 31 are provided with similar slots 33 which serve as seats for the lower ends of spring rings 30. The rings 30 are thus guided against any lateral movement.

Figure 4:
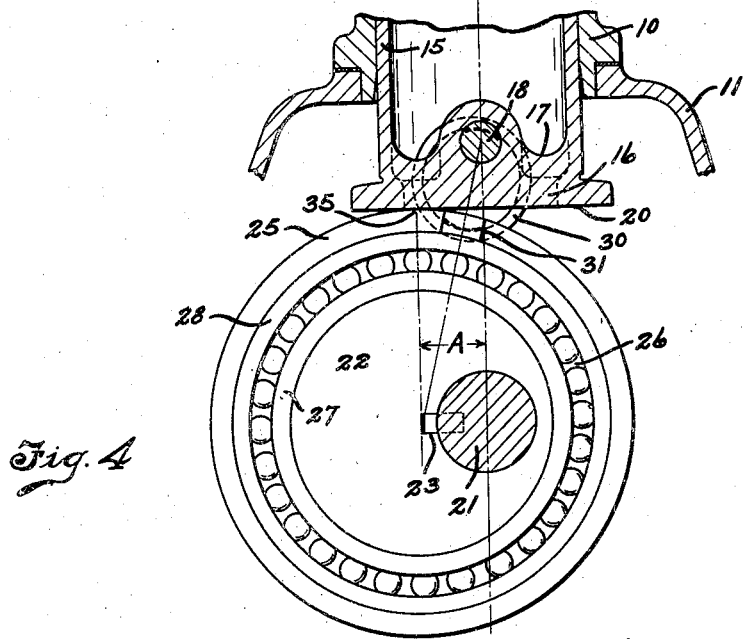
Fig. 4 is a view similar to Fig. 1 but shows the piston at its half stroke position.

It will be obvious that the spring rings 30 will hold ring 25 against rotation upon its own center but will permit it to take angular positions (such as shown in Fig. 4) as the eccentric disk 22 rotates about the shaft 21 as an axis. When ring 25 takes the angular position shown in Fig. 4 the springs 30 have been distorted to their maximum elongation since the point of tangency 35 between cam face 20 and ring 25 is at its maximum distance "A" from the center line of the piston. The slots 32 and 33 in pin 18 and lugs 31 are so rounded at their bottom as to permit the springs 30 to take up their angular positions with a rolling motion rather than a sliding motion.

The tension of spring rings 30 when in place is great enough so that they will overcome the tendency of the piston 15 to leave the ring 25 at top dead center due to the inertia of the piston mass. Of course this tendency increases with the speed of revolution of shaft 21 and hence for higher speeds stronger springs are required than for low speeds.

Figure 5:
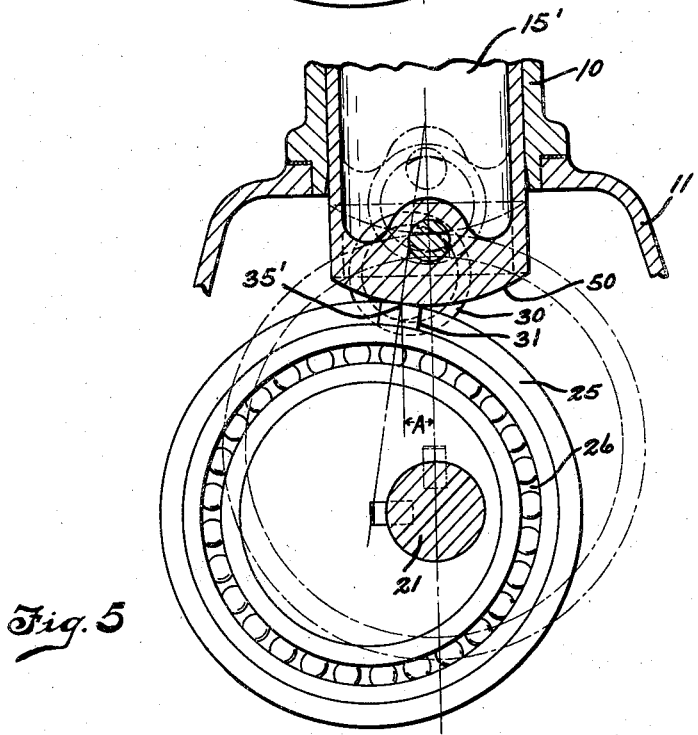
Fig. 5 shows a modification wherein the cam face on the piston is curved rather than straight.

In the modification shown in Fig. 5, the piston 15 is provided with a curved cam face 50 instead of the straight cam face 20 shown in the modifications of Figs. 1 to 4. The effect of this curvature of the cam face is to reduce the distance "A", between the point of tangency 35' and the center line of the piston, as will clearly appear from viewing Fig. 5. Since the distance "A" is reduced there will be less tendency of piston 15' to cock laterally in the cylinder 10 and hence a shorter piston may be used.

In the modification of Figs. 1 to 4 the piston moves in simple harmonic motion, as will be obvious to those skilled in the art.

In Fig. 5 however the curvature of cam face 50 causes the piston motion to depart slightly from simple harmonic motion.

This invention is particularly well adapted for small reciprocating pumps which operate at relatively low speeds.

While the form of embodiment of the present invention as herein disclosed, constitutes a preferred form, it is to be understood that other forms might be adopted, all coming within the scope of the claims which follow.

What is claimed is as follows:

1. In combination, a cylinder having a reciprocating piston therein, a crank shaft having a crank throw for reciprocating said piston, a piston bearing within which said throw rotates, and elastic means attached to said bearing and piston whereby said piston is reciprocated, said means also holding said ring from rotating upon its own axis whereby said ring is given a motion similar to that of a connecting rod.

2. In combiantion, a cylinder, a reciprocating piston therein having a cam face transverse the skirt portion thereof, a crank shaft having a crank throw, a piston bearing in which said throw may rotate, and elastic means attached to said bearing and piston for holding said piston in engagement with said ring.

3. In combination, a cylinder, a reciprocating piston therein having a cam face transverse the skirt portion thereof, a crank shaft having a crank throw, a ring having a bearing upon said throw and reciprocated thereby, and a metal spring sufficiently strong to overcome the inertia of the piston at top dead center for holding said piston and ring in contact at all times.

4. In combination, a cylinder, a reciprocating piston therein having a cam face transverse the skirt portion thereof, a crank shaft having a crank throw, a ring having a bearing upon said throw and reciprocated thereby, and a metal spring sufficiently strong to overcome the inertia of the piston at top dead center for holding said piston and ring in contact at all times, said spring yielding slightly to permit a rolling movement of said ring upon said cam face.

5. In combination, a cylinder, a reciprocating piston therein having a cam face transverse the skirt portion thereof, a crank shaft having a crank throw, a ring having a bearing upon said throw and reciprocated thereby, two oppositely extending lateral lugs upon said ring, and yieldable means engaging said lugs and some portion of said piston for holding the cam face of said piston in contact with said ring.

In testimony whereof I hereto affix my signature.

GEORGE E. A. HALLETT.